United States Patent [19]

Nylander

[11] Patent Number: 6,063,845
[45] Date of Patent: May 16, 2000

[54] COMPOSITION FOR AN ELECTRIC CABLE

[75] Inventor: Perry Nylander, Göteborg, Sweden

[73] Assignee: Borealis A/S, Lyngby, Denmark

[21] Appl. No.: 09/111,206

[22] Filed: Jul. 7, 1998

[30] Foreign Application Priority Data

Dec. 15, 1997 [SE] Sweden .................................. 9704648

[51] Int. Cl.$^7$ ............................... C08J 3/00; C08K 5/36; C08K 5/48; C08L 23/06; H02G 15/00

[52] U.S. Cl. .......................... 524/284; 523/173; 524/283; 524/275; 524/300; 524/306; 524/308; 524/310; 524/312; 524/315; 524/317; 524/318

[58] Field of Search .................................... 524/275, 284, 524/300, 306, 308, 310, 312, 315, 317, 318, 283; 523/173

[56] References Cited

U.S. PATENT DOCUMENTS 4,812,505  3/1989  Topcik .
5,420,185  5/1995  Watanabe et al. ...................... 524/210

FOREIGN PATENT DOCUMENTS 0 057 604 A1  8/1982  European Pat. Off. .
0 297 414 A2  1/1989  European Pat. Off. .
0 513 569 A1  11/1992  European Pat. Off. .
3827 957 A1  3/1990  Germany .

OTHER PUBLICATIONS

File WPI, Derwent accesiion No. 78–15138A, Hitachi Cable Ltd: "Electrical insulate material comprise organic insulate polyethylene fatty acid waterproofing agent lead stearate" & JP, A, 53003700, DW7808.

Ashcraft, A.C., "Water Treeing in Polymeric Dielectrics", World Electrotechnical Congress in Moscow, USSR, Jun. 22, 1977.

Land H.G., Schädlich Hans, "Model Cable Test for Evaluating the Ageing Behaviour under Water Influence of Compounds for Medium Voltage Cables", Conference Proceedings of Jicable 91, Jun. 24–28, 1991, Versailles, France.

*Primary Examiner*—Patrick D. Niland
*Attorney, Agent, or Firm*—Merchant & Gould P.C.

[57] ABSTRACT

A composition for an electric cable is described. The composition is characterized in that it comprises an ethylene plastic and a compound of the general formula (I)

$$R^1O[C_3H_5(OR^2)O]_nR^3 \quad (I)$$

where
$n \geq 1$,
$R^1$, $R^2$ and $R^3$, which are the same or different, designate hydrogen or the residue of a carboxylic acid with 8–24 carbon atoms, with the proviso that there are at least two free OH groups and at least one residue of a carboxylic acid with 8–24 carbon atoms in the molecule. Preferably, $n=3–12$ and $R^1$, $R^2$ and $R^3$ designate hydrogen or stearoyl and the compound of formula (I) is present in an amount of 0.05–2% by weight of the composition. The compound of formula (I) may be combined with other additives, such as polyethylene glycols. The composition may be used as an insulating layer or a semiconductive layer in an electric cable.

9 Claims, No Drawings

COMPOSITION FOR AN ELECTRIC CABLE

FIELD OF THE INVENTION

The present invention relates to a composition for electric cables. More particularly, the present invention relates to a composition for insulating and semiconducting layers of an electric cable having improved water treeing properties and a low dissipation factor.

BACKGROUND OF THE INVENTION

Electric cables and particularly electric power cables for medium and high voltages may be composed of a plurality of polymer layers extruded around the electric conductor. In power cables the electric conductor is usually coated first with an inner semiconductor layer followed by an insulating layer, then an outer semiconductor layer followed by water barrier layers, if any, and on the outside a sheath layer. The layers of the cable are based on different types of ethylene plastics which usually are crosslinked.

The insulating layer and the semiconducting layers of an electric cable normally comprise an ethylene plastic. By the expression "ethylene plastic" is meant, generally and in connection with the present invention, a plastic based on ethylene home- and/or copolymers of ethylene, wherein the ethylene monomer constitutes the major part of the mass. Thus, polyethylene plastics may be composed of homopolymers or copolymers of ethylene, wherein the copolymers may be graft copolymers or copolymers of ethylene and one or more monomers which are copolymerisable with ethylene.

LDPE (low density polyethylene, i.e. polyethylene prepared by radical polymerisation at a high pressure) crosslinked by adding peroxide, for instance dicumyl peroxide, in connection with the extrusion of the cable, is today the predominant cable insulating material.

The inner semiconducting layer normally comprises an ethylene copolymer, such as an ethylene-vinyl acetate copolymer (EVA), and ethylene-ethyl acrylate copolymer (EEA), or an ethylene-butyl acrylate copolymer (EBA) together with a sufficient amount of carbon black to make the composition semiconducting. The composition of the outer semiconducting layer differs depending on whether it has to be strippable or not. Normally a strippable semiconducting layer comprises an ethylene copolymer, such as an ethylene-vinyl acetate copolymer (EVA), optionally together with an acrylonitrile-butadiene rubber (NBR), and sufficient carbon black to make the composition semiconducting. A non-strippable (bonded), outer semiconducting layer may comprise EVA, EEA or EBA together with an amount of carbon black sufficient to make the composition semiconducting.

A limitation of ethylene plastic is its tendency to be exposed, in the presence of water and under the action of strong electric fields, to the formation of dendritically branched defects, so-called water trees, which can lead to breakdown and possible electric failure. This tendency is strongly affected by the presence of inhomogeneities, microcavities and impurities in the material. Water treeing has been studied carefully, especially since the 1970's, when polymer materials and, in particular, cross-linked polyethylene became the predominant insulating material for electric cables for medium and high voltages. In the past years, these studies have entailed improvements in the construction of the cables, the manufacturing procedure and the quality and cleanliness of the used materials. These improvements have resulted in an increased service life of the manufactured cables.

From European Patent Specification EP-A-0 057 604 it is known to inhibit water treeing by adding to a semiconducting composition, which mainly consists of a polyolefin and 5–50% by weight carbon black based on the weight of the total composition, a polyethylene glycol having a molecular weight of about 1000–20000 in an amount of 0.1–20% by weight. This composition is intended for semiconducting layers of electric cables and by adding polyethylene glycol, it is said to be possible to eliminate water trees which grow into the insulating layer from the interface between the insulating layer and the semiconducting layer.

Moreover, U.S. patent Specification U.S. Pat. No. 4,812,505 discloses a composition, which is usable as insulating layer in electric cables and which is resistant to water treeing. The composition comprises a copolymer of ethylene and at least one alpha-olefin having 4–8 carbon atoms, such as 1-butene, 1-hexane or 1-octene, and besides comprises a polyethylene glycol having a molecular weight in the range of about 1000–20000 in an amount of 0.1–20% by weight.

In spite of the compositions according to the prior art and the resistance to water treeing that they afford, there is a need for materials having further improved properties with regard to water tree resistance (WTR), electrical breakdown strength and dielectric dissipation factor.

SUMMARY OF THE INVENTION

It has now surprisingly been found that excellent results with regard to water tree resistance and electrical breakdown strength combined with a remarkably low dielectric dissipation factor can be achieved by incorporating in compositions for electric cables a specific glycerol fatty acid ester additive, optionally in combination with further additives like e.g. polyethylene glycols.

The present invention thus provides a composition for an electric cable, characterised in that it comprises an ethylene plastic and a compound of the general formula (I)

$$R^1O[C_3H_5(OR^2)O]_nR^3 \tag{I}$$

where n≧1, preferably, because of commercial availability, n=1–20, and more preferably n=3–12, $R^1$, $R^2$ and $R^3$, which are the same or different, designate hydrogen or the residue of a carboxylic acid with 8–24 carbon atoms, with the proviso that there are at least two free OH groups and at least one residue of a carboxylic acid with 8–24 carbon atoms in the molecule.

Other distinguishing features and advantages of the present invention will appear from the following specification and the appended claims.

DETAILED DESCRIPTION OF THE INVENTION

The compound of the general formula (I) is a mono- or polyglycerol ether where at least one OH group forms an ester with a carboxylic acid with 8–24 carbon atoms. Preferably, the compound of formula (I) is a monoester, i.e. it contains one rest of a carboxylic acid with 8–24 carbon atoms per molecule. Further, the ester forming carboxylic acid preferably forms the ester with a primary hydroxyl group of the glycerol compound. The compound of formula (I) may include 1–20, preferably 1–15, most preferably 3–8 glycerol units, i.e. n in the formula (I) is 1–20, preferably 1–15, and most preferably 3–12.

When $R^1$, $R^2$ and $R^3$ in formula (I) do not designate hydrogen they designate the residue of a carboxylic acid with 8–24 carbon atoms. These carboxylic acids may be saturated or unsaturated and branched or unbranched. Illustrative, non-limiting examples of such carboxylic acids are lauric acid, myristic acid, palmitic acid, stearic acid, oleic acid, linoleic acid, and linolenic acid. When the carboxylic residue is unsaturated the unsaturation may be utilised for binding the compound of formula (I) to the ethylene plastic of the composition and thus effectively prevent migration of the compound from the composition. In formula (I) $R^1$, $R^2$, and $R^3$ may designate the same carboxylic acid residue, such as stearoyl, or different carboxylic acid residues, such as stearoyl and oleoyl.

To prevent migration and exudation, the compound of formula (I) should be compatible with the composition in which it is incorporated, and more particularly with the ethylene plastic base resin of the composition.

The compounds of formula (I) are known chemical compounds or may be produced by known methods. Thus, a compound of formula (I) where n=3 is commercialized as Atmer 184 (or 185) by I. C. I. and one where n in average is 8, having one fatty acid residue per molecule, can be obtained from I. C. I. under the denomination SCS 2064. As other examples of compounds of formula (I) may be mentioned those available from Danisco A/S, Denmark, under the trade names TS-T215, TS-T216 and TS-T219. These are all compounds with six glycerol units, i.e. n=6, and have one fatty acid residue per molecule. For TS-T215 the fatty acid residue is derived from steacic acid/-palmitic acid (1:1), for TS-T216 it is derived from behenic acid and for TS-T219 it is derived from oleic acid.

The compound of formula (I) is incorporated in the composition of the invention in an amount effective for inhibiting the generation of water trees. Generally, this means that the compound of formula (I) is incorporated in an amount of about 0.05–2% by weight, preferably 0.1–1% by weight of the composition.

In addition to the compound of formula (I) the composition of the present invention may include conventional additives, such as antioxidants to counteract decomposition due to oxidation, radiation, etc.; lubricating additives, such as stearic acid; crosslinking additives, such as peroxides which decompose upon heating and initiate crosslinking; and other water tree retarding additives besides the compound of formula (I) according to the present invention. The overall amount of additives, including the compound of formula (I) in the composition of the present invention should not exceed about 10% by weight of the composition.

It has been found to be particularly advantageous if, in addition to the compound of formula (I) a further additive like e.g. polyethylene glycols is included in the composition. Such a combination of additives may further improve some electrical properties. Preferably, the polyethylene glycols have a molecular weight in excess of about 1000, such as from about 1000 to about 50000 and preferably from about 4000 to about 30000. The amount of each of these further additives is up to about 5% by weight, preferably 0.05–5% by weight, and more preferably 0.05–3% by weight, most preferably 0.2–1% by weight, with the provision mentioned above that the overall amount of WTR- and stabilizer-additives in the composition should not exceed about 10% by weight of the composition.

It has been found that a combination of the compund of formula (I) with a polyethylene glycol gives very good electrical properties, particularly with regard to the dielectric strength where a synergistic effect has been observed. In such a combination the amount of the compound of formula (I), as indicated earlier, should lie in the range about 0.05–2% by weight, preferably 0.1–1% by weight, while the amount of the polyethylene glycol, as indicated above, should lie in the range 0.05–5% by weight, more preferably 0,05–3% by weight, and most preferably 0.1–1% by weight. The combined amount of the additives of the compound of formula (I) and the polyethylene glycol should lie in the range 0.1–7% by weight, preferably 0.2–2% by weight, and most preferably 0.4–1% by weight. As a particularly preferred combination may be mentioned about 0.35% by weight of the above mentioned product from I. C. I. under the denomination SCS 2064 and about 0.25% by weight of a polyethylene glycol with a molecular weight of about 20000.

Besides the compound of formula (I) and the other conventional and optional additives mentioned above the composition of the invention predominantly comprises an ethylene plastic as indicated earlier. The choice and composition of the ethylene plastic varies depending on whether the composition is intended as an insulating layer of an electric cable or as an inner or outer semiconducting layer of an electric cable.

A composition for an insulating layer of an electric cable may for example comprise about 0.05% to about 10% by weight of the compound of formula (I) together with other conventional and optional additives; 0 to about 4% by weight of a peroxide crosslinking agent; the remainder of the composition substantially consisting of an ethylene plastic. Such ethylene plastic preferably is an LDPE, i.e. an ethylene homopolymer or a copolymer of ethylene and one or more alpha-olefins with 3–8 carbon atoms, such as 1-butene, 4-methyl-l-pentene, 1-hexene, and 1-octene. The amount of alpha-olefin comonomer(s) may be in the range from about 1% to about 40% by weight of the ethylene plastic.

Similarly, a composition for a semiconductive layer of an electric cable may comprise about 0.05% to about 10% by weight of the compound of formula (I) together with other conventional and optional additives; about 30–80% by weight of an ethylene plastic; carbon black in an amount at least sufficient to make the composition semiconducting, preferably about 15–45% by weight of carbon black; 0 to about 30% by weight of an acrylonitrile-butadiene copolymer; and 0 to about 4% by weight of a peroxide crosslinking agent. In this connection the ethylene plastic is an ethylene copolymer, such as EVA, EMA, EEA or EBA.

In order to further facilitate the understanding of the invention some illustrating, non-limiting examples will be given below. In the examples all percentages and parts refer to weight, unless otherwise stated.

In the following examples the polymer compositions were tested for water tree resistance (WTR) by so-called Ashcraft testing. This test method has been described by Ashcraft, A. C., "Water Treeing in Polymeric Dielectrics", World Electrotechnical Congress in Moscow, USSR, Jun. 14, 1977. By Ashcraft testing, well characterised effects are provided, viz. sharp, water-filled indentations, by means of a needle in compression-moulded cups. A voltage of 5 kV/6 kHz is applied across the water, whereas the bottom of the cup is connected to earth. The temperature is kept constant at 65° C. The average length of the water trees after 72 h ageing is considered as a measure of the growth rate of the water trees in the specific material. The average length of the water trees is expressed as percent (%) of the length of the water trees of a similar reference material without additives.

In the following examples testing of the dielectric strength of the compositions was carried out on test cables in accordance with a method developed by Alcatel AG & Co, Hannover, Germany, and described in an article by Land H. G., Schadlich Hans, "Model Cable Test for Evaluating the Ageing Behaviour under Water Influence of Compounds for Medium Voltage Cables", Conference Proceedings of Jicable 91, Jun. 24–28, 1991, Versaille, France. As a value of the dielectric strength is stated 63% of $E_{max}$ from Weibull diagram in kV/mm. The dielectric strength was measured after ageing for 1000 h at 9 kV/mm in 85/70° C. water.

Determination of the dissipation factor (tan δ) of the materials in the examples was made at 50 Hz and 130° C. according to ASTM 150 (1987). Measurement was made on 3.0 mm pressmoulded plaques at 500 V directly after pressmoulding.

EXAMPLES 1–13 and COMPARATIVE EXAMPLES 1–3

In these examples thirteen compositions (twelve according to the invention and one comparative) for use as insulating layers of electric cables were produced (Examples 1–13) together with three reference compositions (Comparative Examples 1–3). The compositions were made in a conventional manner by compounding the components in an extruder. The compositions of the materials of Examples 1–13 and Comparative Examples 1–3 are shown in Table 1 together with their properties (WTR, dielectric strength, and dissipation factor), determined as explained above. All of the compositions were crosslinked compositions and included a crosslinking agent (dicumyl peroxide) in an amount of about 2 parts by weight/100 parts of polymer composition.

TABLE 1

|  | Example 1 | Example 2 | Example 3 |
|---|---|---|---|
| COMPOSITION | | | |
| Resin: | | | |
| LDPE (density = 0.924 g/cm³; MFR$_2$ = 2) | 99 | 98.73 | 98.80 |
| Compound of formula (I): | | | |
| glyceryl monostearate | 0.075 | | |
| polyglyceryl mono-fatty acid ester (SCS 2064) | | 0.35 | 0.35 |
| Polyethylene glycol (PEG 20000) | 0.25 | 0.25 | 0.25 |
| Irganox 1035 | 0.25 | 0.2 | 0.2 |
| Irganox PS 802 | 0.4 | 0.4 | 0.4 |
| Oleamide | 0.025 | | |
| NMP (N-methyl pyrrolidone) | 0.07 | | |
| Calcium hydroxystearate (CS-6, ACAD) | | | |
| Crosslinking agent, parts/100 parts of polymer composition | 1.9 | 2.3 | 2.2 |
| PROPERTIES | | | |
| Water trees, % length of reference | 44.5 | 52.5 | 44 |
| Dielectric strength, kV/mm | 49.4 | >72.1 | 64.3 |
| Dissipation factor (E-4), 130° C. | 7.1 | 0.7 | 0.2 |

|  | Example 4 | Example 5 |
|---|---|---|
| COMPOSITION | | |
| Resin: | | |
| LDPE (density = 0.924 g/cm³; MFR$_2$ = 2) | 98.97 | 98.96 |
| Compound of formula (I): | | |
| glyceryl monostearate | | |
| polyglyceryl mono-fatty acid ester (SCS 2064) | 0.35 | 0.35 |
| Polyethylene glycol (PEG 20000) | 0.25 | 0.25 |
| Irganox 1035 | | |

TABLE 1-continued

|  |  |  |
|---|---|---|
| Irganox PS 802 | 0.33 | 0.34 |
| Oleamide | | |
| NMP (N-methyl pyrrolidone) | 0.1 | 0.1 |
| Calcium hydroxystearate (CS-6, ACAD) | | |
| Crosslinking agent, parts/100 parts of polymer composition | 2.15 | 1.5 |
| PROPERTIES | | |
| Water trees, % length of reference | | |
| Dielectric strength, kV/mm | | |
| Dissipation factor (E-4), 130° C. | 0.3 | 0.4 |

|  | Example 6 | Example 7 | Example 8 |
|---|---|---|---|
| COMPOSITION | | | |
| Resin: | | | |
| LDPE (density = 0.924 g/cm³; MFR$_2$ = 2) | 98.8 | 99.2 | 98.63 |
| Compound of formula (I): | | | |
| glyceryl monostearate | 0.35 | 0.15 | |
| polyglyceryl mono-fatty acid ester (SCS 2064) | | | 0.6 |
| Polyethylene glycol (PEG 20000) | 0.25 | | |
| Irganox 1035 | 0.2 | 0.2 | 0.2 |
| Irganox PS 802 | 0.4 | 0.4 | 0.4 |
| Oleamide | | 0.5 | |
| NMP (N-methyl pyrrolidone) | | | 0.07 |
| Calcium hydroxystearate (CS-6, ACAD) | | | |
| Crosslinking agent, parts/100 parts of polymer composition | 1.9 | 1.9 | 2.2 |
| PROPERTIES | | | |
| Water trees, % length of reference | | 44.5 | 37.0 |
| Dielectric strength, kV/mm | 61.3 | | 52.5 |
| Dissipation factor (E-4), 130° C. | 20.6 | 1.5 | 1.8 |

|  | Example 9 | Example 10 | Example 11 | Example 12 | Example 13 |
|---|---|---|---|---|---|
| COMPOSITION | | | | | |
| Resin: | | | | | |
| LDPE (density = 0.924 g/cm³; MFR$_2$ = 2) | 99.07 | 99.06 | 98.73 | 99.15 | 98.87 |
| Compound of formula (I): | | | | | |
| glyceryl monostearate | | | | | |
| polyglyceryl mono-fatty acid ester (SCS 2064) | 0.35 | 0.35 | 0.6 | | 0.35 |
| Polyethylene glycol (PEG 2000) | 0.25 | 0.25 | | 0.25 | 0.18 |
| Irganox 1035 | | | 0.2 | 0.2 | 0.2 |
| Irganox PS 802 | 0.33 | 0.34 | 0.4 | 0.4 | 0.4 |
| Oleamid | | | | | |
| NMP (N-methyl pyrrolidone) | | | 0.07 | | |
| Calcium hydroxystearate (CS-6, ACAD) | | | | | |
| Crosslinking agent, parts/100 parts of polymer composition | 2.15 | 1.5 | 2.2 | 1.9 | 1.9 |
| PROPERTIES | | | | | |
| Water trees, % length of reference | | | 37 | | |
| Dielectric strength, kV/mm | | | 52.5 | 55.4 | 87 |
| Dissipation factor (E-4), 130° C. | 0.3 | 0.4 | 1.8 | | 0.4 |

|  | Comp. Example 1 | Comp. Example 2 | Comp. Example 3 |
|---|---|---|---|
| COMPOSITION | | | |
| Resin: | | | |
| LDPE (density = 0.924 g/cm³; MFR$_2$ = 2) | 98.85 | 99.25 | 99.8 |
| Compound of formula (I): | | | |
| glyceryl monostearate | | | |
| polyglyceryl mono-fatty acid ester (SCS 2064) | | | |
| Polyethylene glycol (PEG 20000) | 0.25 | | |
| Rhodianox TBM 6P* | 0.25 | 0.25 | 0.2 |
| Seenox 412S** | 0.4 | 0.4 | |
| Oleamid | 0.1 | 0.1 | |
| NMP (N-methyl pyrrolidone) | | | |
| Calcium hydroxystearate (CS-6, ACAD) | 0.15 | 0.15 | |

TABLE 1-continued

| | | | |
|---|---|---|---|
| Crosslinking agent, parts/100 parts of polymer composition | 1.9 | 1.8 | 2 |
| PROPERTIES | | | |
| Water trees, % length of reference | 43 | 63.5 | 90 |
| Dielectric strength, kV/mm | 46.44 | 46 | 41.4 |
| Dissipation factor (E-4), 130° C. | 37.9 | 7.2 | 2 |

\* = 4,4'-thiobis-(2-methyl-5-t-butyl-phenol)
\*\* = Pentaerythritol tetrakis[3-(n-dodecylthio)propionate]

When comparing the properties of the different compositions in Table 1 it is evident that the compound of formula (I), in particular when n in formula (I) is more than 1, is an effective WTR additive and, especially, results in a low dissipation factor. It is also evident that when combining the compound of formula (I) with another additive like polyethylene glycol, electrical properties may be further enhanced.

Thus, when comparing e.g. Examples 11, 12 and 13 it is noticed that the composition of Ex. 11 which contains a compound of formula (I) (SCS 2064), but no polyethylene glycol, has a dielectric strength of 52.5 kV/mm; the composition of Ex. 12 (which is a comparative example) which contains polyethylene glycol, but no compound of formula (I) has a dielectric strength of 55.4 kV/mm; while the composition of Ex. 13 which contains a combination of a compound of formula (I) and a polyethylene glycol has a synergistically increased dielectric strength of 87 kV/mm.

EXAMPLES 14–15 and COMPARATIVE EXAMPLE 4

In this example two compositions for use as semiconducting layers of electric cables were produced (Examples 14 and 15) together with a reference composition (Comparative Example 4). The compositions were made in a conventional manner by compounding the components in an extruder. The compositions of the materials of Examples 14–15 and Comparative Example 4 are shown in Table 2 together with their properties (WTR, dielectric strength, and dissipation factor), determined as explained above.

When comparing the properties of the the compositions in Table 2 it is evident that the dielectric strength increases with addition of the compound of formula (I). The increase of the dielectric strength is particularly significant when a triglycerylmonofatty acid ester is added, i.e. when n>1 in formula (I).

What is claimed is:

1. A composition for an electric cable, which composition comprises an ethylene plastic and a compound of the general formula (I)

$$R^1O[C_3H_5(OR^2)O]_nR^3 \quad (I)$$

where
n=3–20,
$R^1$, $R^2$ and $R^3$, which are the same or different, designate hydrogen or the residue of a carboxylic acid with 8–24 carbon atoms,
with the proviso that there are at least two free OH groups and at least one residue of a carboxylic acid with 8–24 carbon atoms in the molecule.

2. A composition as claimed in claim 1, wherein n=3–8.

3. A composition as claimed in claim 1, wherein $R^1$, $R^2$, and $R^3$, which are the same or different, designate hydrogen, lauroyl, myristoyl, palmitoyl, stearoyl, oleoyl, linoloyl, and linolenoyl.

4. A composition as claimed in claim 1, wherein the compound of the formula (I) is present in an amount of 0.05–2% by weight of the composition.

5. A composition as claimed in claim 4, wherein the compound of the formula (I) is present in an amount of 0.1–1% by weight of the composition.

TABLE 2

| | Example 14 | Example 15 | Comp. Example 4 |
|---|---|---|---|
| COMPOSITION | | | |
| Resin: | | | |
| LDPE (density = 0.924 g/cm³; MFR₂ = 2) EBA (17% BA; density = 0.924 g/cm³; MFR₂ = 7) | 59.95 | 59.85 | 60.35 |
| Compound of formula (I): | | | |
| glyceryl monostearate | 0.4 | | |
| triglyceryl mono-fatty acid ester (Atmer 184,185) | | 0.5 | |
| Polytrimethyl dihydroquinoline (Vulcanox HPG) | 0.65 | 0.65 | 0.65 |
| Carbon black | 39 | 39 | 39 |
| Crosslinking agent, parts/100 parts of composition | 1.1 | 1.1 | 1.1 |
| PROPERTIES | | | |
| Dielectric strength, kV/mm | 46 | 62.7 | 41 |

6. A composition as claimed in claim 1, wherein the composition further comprises a polyethylene glycol having a molecular weight in the range of about 1000 to about 50 000 in an amount of about 0.1 to about 5% by weight of the composition.

7. A composition as claimed in claim 6, wherein the composition comprises a compound of formula (I) containing one residue of a carboxylic acid with 8–24 carbon atoms in the molecule and wherein n=3–12; together with a polyethylene glycol having a molecular weight in the range of about 4000 to about 30000; and wherein the combined amount of the compound of formula (I) and the polyethylene glycol lies in the range 0.2–2% by weight of the composition.

8. A composition as claimed in claim 1, wherein the composition forms an insulating layer of an electric cable.

9. A composition as claimed in claim 1, wherein the composition includes carbon black in an amount sufficient to make the composition semiconductive and forms a semiconducting layer of an electric cable.

* * * * *

UNITED STATES PATENT AND TRADEMARK OFFICE
CERTIFICATE OF CORRECTION

PATENT NO. : 6,063,845
DATED : May 16, 2000
INVENTOR(S) : Nylander

Page 1 of 1

It is certified that error appears in the above-identified patent and that said Letters Patent is hereby corrected as shown below:

Column 5-6,
Table 1, line 12: "0.07" should be over one column so that it is under column entitled "Example 2"

Signed and Sealed this

Seventeenth Day of July, 2001

Attest:

*Attesting Officer*

NICHOLAS P. GODICI
*Acting Director of the United States Patent and Trademark Office*